Figure 1:
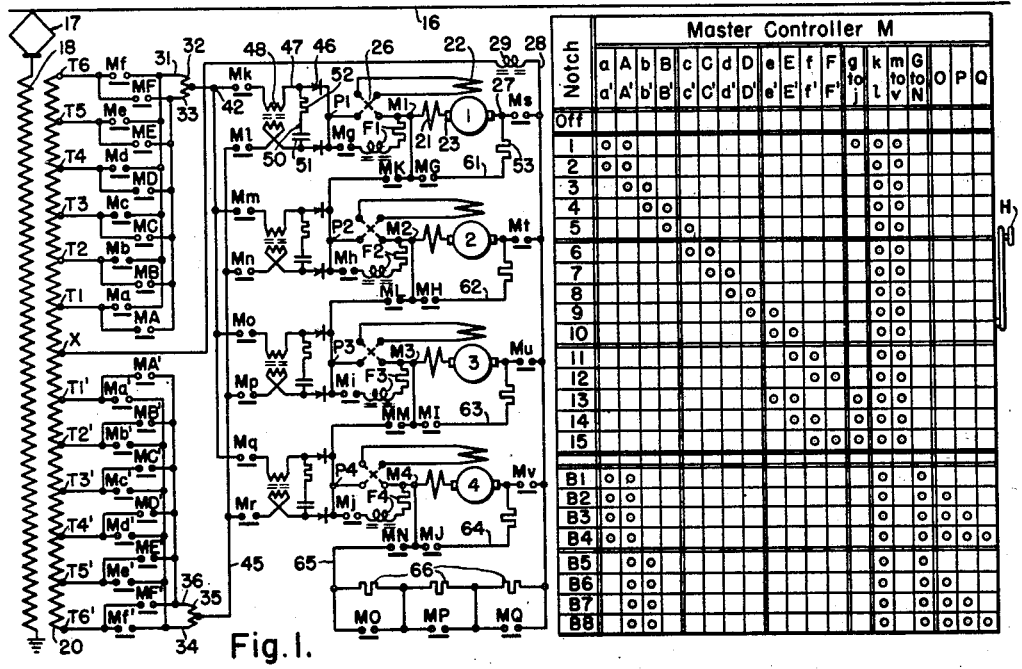

March 24, 1953     L. J. HIBBARD     2,632,873

RECTIFIER-POWERED MOTOR WITH DYNAMIC BRAKING

Filed April 21, 1951

WITNESSES:
Robert C. Baird
Leon J. Taza

INVENTOR
Lloyd J. Hibbard.
BY O. B. Buchanan
ATTORNEY

Patented Mar. 24, 1953

2,632,873

UNITED STATES PATENT OFFICE 2,632,873

RECTIFIER-POWERED MOTOR WITH DYNAMIC BRAKING

Lloyd J. Hibbard, Pittsburgh, Pa., assignor to Westinghouse Electric Corporation, East Pittsburgh, Pa., a corporation of Pennsylvania Application April 21, 1951, Serial No. 222,272

13 Claims. (Cl. 318—63)

My invention relates to rectifier-powered traction-equipment for single-phase-energized vehicles, and it has particular relation to a control-equipment for such vehicles whereby the direct-current traction-motors may be used for dynamic braking as well as for motoring purposes.

Heretofore, rectifier-powered trolley-energized equipments have been known, in which series direct-current motors have been energized through a pair of rectifiers from a variable-voltage transformer which receives its power from an alternating-current trolley, as described and claimed in my application Serial No. 120,331, filed October 8, 1949, and in my application Serial No. 210,390, filed February 10, 1951.

A distinctive feature of my present invention is to energize the series main-field windings through the rectifiers from low-voltage taps of the transformer, during dynamic braking, while at the same time the motor-armature or armatures are substantially disconnected from the power-supply means, and are connected to suitable braking-resistance means, for producing the dynamic-braking action.

With the foregoing and other objects in view, my invention consists in the circuits, systems, combinations, apparatus, parts, and methods of design and operation, as hereinafter described and claimed, and illustrated in the accompanying drawing, wherein the two figures are simplified diagrammatic views of circuits and apparatus, illustrating my invention in two different exemplary forms of embodiment.

As shown in both figures of the drawing, my invention is adapted to be used in connection with a single-phase trolley-wire 16, which may be of 25 cycles, 60 cycles, or any other suitable frequency. Each figure diagrammatically represents a multiple-motored locomotive or car, showing only the apparatus which is essential to an understanding of my present invention. Single-phase power is taken from the trolley-wire 16 by a pantograph 17, or other current-collecting device, and fed into the primary winding of a variable-voltage transformer 18. By way of illustration, the transformer 18 is illustrated as having a multi-tapped secondary winding 20, which is provided with a midpoint-tap X, a plurality of voltage-controlling taps T1 to T6 which are disposed on one side of the midpoint-tap X, and also a plurality of corresponding voltage-controlling taps T1' and T6' which are disposed on the other side of the midpoint-tap X.

Each locomotive or car is provided with one or more series direct-current traction-motors. By way of illustration, four motors are shown, the armatures of which are numbered 1 to 4, in accordance with a usual convention. Each motor is provided with a series interpole winding 21 and a series main-field winding 22. The interpole winding 21 is shown, by way of illustration, as being connected between the positive armature-terminal 23 and a positive motor-terminal M1, M2, M3 or M4, as the case may be. The series main-field winding 22 is illustrated as being connected between the positive motor-terminal M1, M2, M3 or M4 and a positive direct-current terminal P1, P2, P3 or P4, as the case may be, through a reverser 26.

The negative motor-terminals 27 of the several motors 1 to 4 are connected to a common negative return-lead 28, through separate switch-contacts Ms to Mv, which are under the control of a master controller M or other multi-step control-means for controlling the energization of the motors during motoring and braking. The common negative return-circuit 28 of the four motors is shown as being connected back to the transformer midpoint-tap X through a serially connected reactance or choke coil 29 which reduces the direct-current ripples.

The secondary voltage of the transformer 18 is controlled by means of a plurality of tap-switches Ma to Mf, MA to MF, Ma' to Mf' and MA' to MF'. The switch-contacts Ma to Mf are connected, respectively, between the transformer-taps T1 to T6, and a terminal 31 of a preventive coil 32. The switch-contacts MA to MF are connected, respectively, between these same transformer-taps T1 to T6, and the other terminal 33 of the preventive coil 32. The switch-contacts Ma' to Mf' are connected respectively between the other transformer-taps T1' to T6' and a terminal 34 of a second preventive coil 35. The switch-contacts MA' to MF' are connected respectively between said other transformer-taps T1' to T6' and the second terminal 36 of the second preventive coil 35. The midtaps of the two preventive coils 32 and 35 are connected to conductors 42 and 45 which constitute the variable-voltage secondary terminals of the transformer 18.

The positive direct-current terminals P1 to P4 of the four motors 1 to 4 are separately energized from the variable-voltage secondary-terminals 42 and 45, through separate pairs of rectifiers which are diagrammatically indicated at 46, and which are intended to represent any suitable kind of rectifiers, such as ignitrons, which have the property of becoming conductive during an early part of each positive half-cycle of the impressed alternating-current voltage, and of then remaining conductive until substantially the end of that positive half-cycle. Each pair of rectifiers 46 constitutes a rectifier-assembly for that motor. The two cathodes of that pair are connected to the positive supply-conductor P1, P2, P3 or P4, as the case may be.

Figure 2:
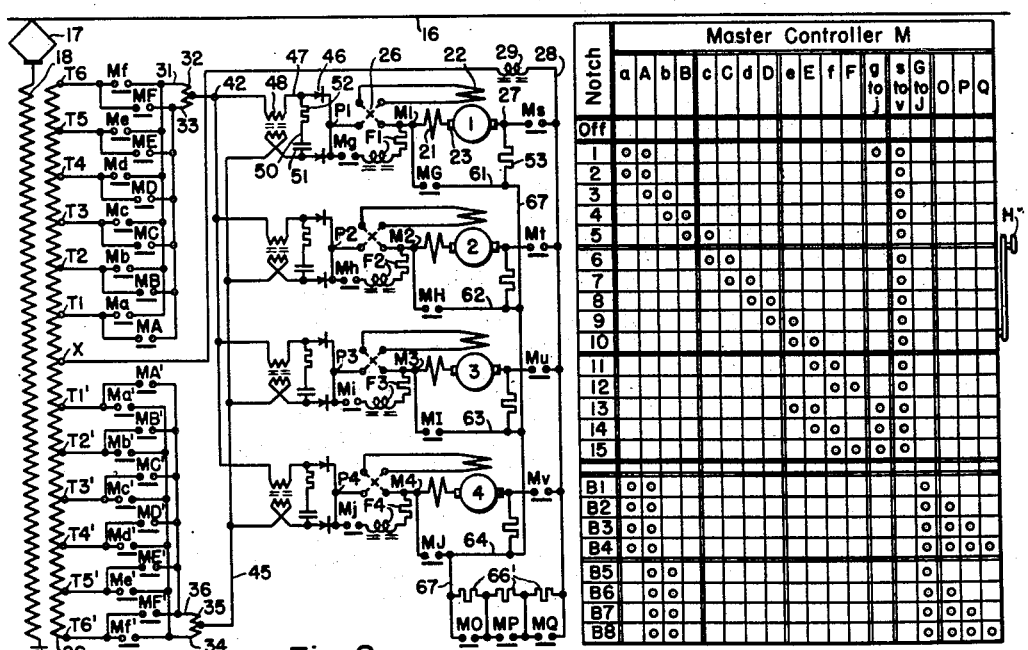

The two anode-leads 47 of each rectifier-pair are connected to the respective secondary conductors 42 and 45 through mutually coupled anode-reactors 48. In Fig. 1, the connections from the secondary terminals 42 and 45 to the respective pairs of anode-leads 47 include individual switch-contacts M$k$ to M$r$, respectively, which are under the control of the master controller M. In Fig. 2, these controller-controlled contacts M$k$ to M$r$ are omitted, and the several pairs of anode-leads 47 are directly connected to the secondary terminals 42 and 45 which constitute a variable-voltage alternating-current supply-source for the several rectifier-assemblies. The two anode-leads 47 of each rectifier-pair are also joined by a filter-circuit 50 which consists of a capacitor 51 and a damping resistance 52, for the purpose of reducing inductive interference due to harmonics in the trolley-wire 16, as explained in my preceding applications.

In most traction-motor control-systems, provision is made for operating the motors 1 to 4, at times, under weakened-field conditions. This is accomplished by means of field-shunts F1 to F4, which are connected in shunt across the respective series main-field windings, under the control of switch-contacts M$g$ to M$j$, which are under the control of the master controller M.

During dynamic braking, it is necessary to connect a braking-resistance load 53 across the terminals of each one of the motors 1, 2, 3 and 4. I accomplish this connection, in the illustrated forms of embodiment of my invention, by means of switch-contacts MG to MJ which are under the control of the master controller M. Thus, the contact MG is connected between the No. 1 positive motor-terminal M1 and a conductor 61, which is in turn connected to the braking resistance 53 for that motor, the other terminal of the braking resistance being connected to the negative motor-terminal 27 of that motor. In like manner, the switch-contact MH is connected between the No. 2 positive motor-terminal M2 and a conductor 62; the switch-contact MI is connected between the No. 3 positive motor-terminal M3 and a conductor 63; and the switch-contact MJ is connected between the No. 4 positive motor-terminal M4 and a conductor 64.

During dynamic braking, provisions must also be made, in accordance with my invention, for energizing the series main-field windings 22 of all four motors 1 to 4, through suitable rectifiers, from the variable-voltage secondary supply-terminals 42 and 45, without simultaneously energizing the motor-armatures 1 to 4 from said secondary supply-terminals 42 and 45. In its broadest concept, my invention contemplates any suitable means for accomplishing this general purpose. Two alternative means to this end are shown in Figs. 1 and 2, respectively, of the drawing.

Thus, in Fig. 1, during the braking operation, the four series main-field windings 22 are connected in series-circuit relation to each other, and are all energized from the pair of rectifiers 46 which are associated with the No. 1 motor. For this purpose, the controller-controlled contacts M$k$ and M$l$ are closed, and the controller-controlled contacts M$m$ to M$r$ are all open. The series connection of the four main-field windings 22 is accomplished, in Fig. 1, by means of four controller-controlled contacts MK to MN. The contact MK is connected between the No. 1 motor-terminal M1 and the second positive supply-terminal P2; the contact ML is connected between the No. 2 motor-terminal M2 and the third positive supply-terminal P3; the contact MM is connected between the No. 3 motor-terminal M3 and the fourth positive supply-terminal P4; and finally the contact MN is connected between the No. 4 motor-terminal M4 and a conductor 65, which is connected, through a variable resistance 66, to the common negative return-circuit 28. The variable resistance 66 is controlled by a plurality of controller-controlled contacts MO to MQ.

In Fig. 2, the four series main-field windings 22 are not connected in series with each other during the braking operation, but each series main-field winding 22 is energized from its own pair of rectifiers 46. In Fig. 2, the four conductors 61 to 64 which are in the four braking-resistance load-circuits are connected together, by means of a common circuit-connection 67, which is connected to the common negative return-circuit 28 through a variable resistance 66' under the control of the switch-contacts MO to MQ.

In both illustrated forms of embodiment of my invention, the various switch-contacts which have been described are illustrated as being parts of a master controller M, which may be controlled by one or more handles H. The various master-controller-controlled contacts are identified by means of distinguishing letter-suffixes, following the designation M for "Master Controller." The controller itself is diagrammatically indicated by means of a switch-sequence chart, in which a closed position of any switch-contact is indicated by the usual convention of a small circle. The illustrated controller M has an off-position, fifteen accelerating or motoring positions designated 1 to 15, and eight braking positions designated B1 to B8.

During the accelerating operation, each of the motors 1 to 4 is energized, through its own rectifier-assembly 46, from the variable-voltage secondary-terminals 42 and 45, and the secondary voltage is progressively increased from the controller-position or notch 2 to the notch 12. In the No. 1 notch of the controller, the minimum-voltage transformer-tap energization is made, the same as in position No. 2, but in position No. 1 the field-shunting contacts M$g$ to M$j$ are also closed, so that the four motors start with a weakened field, thereby reducing their initial tractive-effort, and producing the same effect as an extra ultra-low-voltage tap-contact on the transformer 18.

After the maximum-voltage full-field motoring-position is reached, or notch 12 of the controller, additional high-speed motor-operating conditions can be obtained by field-weakening, by the closure of the controller-controlled contacts M$g$ to M$j$. In the controller which is shown in the drawing, the first high-speed weakened-field position, which is notch 13 of the controller, is accomplished by a stepping back of the accelerating notches by a predetermined amount, as by stepping back to the voltage-condition which prevailed on the accelerating-notch 10. This has the effect of preventing the sudden increase in the tractive effort of the motor which would be produced if the field were greatly weakened while full voltage was being applied to the motor-terminals. The last two motoring-notches, numbers 14 and 15, progressively restore the secondary voltage to its full-voltage value, while restraining the field-weakening.

The illustrated motoring or accelerating-notches 1 to 15 are intended to be representative or symbolic of any suitable motor-acceleration control in which the secondary transformer-voltage is varied.

During braking operation, in accordance with my present invention, three things are essential: first, each motor-armature 1, 2, 3 and 4 must be substantially disconnected from its power-supplying connection, which includes its rectifier-assembly 46 and the common return-circuit 28 which leads back to the transformer-secondary 20; second, the motor-armatures 1 to 4 must be connected to braking-resistance loads 53; and third, the several series main-field windings 22 must be energized, through some rectifier-pair 46, from the secondary terminals 42 and 45, using a low-voltage tap-switching connection.

In both Figs. 1 and 2, during the braking operation, that is, on the controller-notches B1 to B8, the four motor-armatures 1 to 4 are substantially disconnected from their respective motoring-connection by the opening of the controller-controlled contacts Ms to Mv; and the braking-resistors 53 are connected to the several armatures by the closure of the controller-controlled contacts MG to MJ. In Fig. 1, the series-connection energizing-circuit for all four main-field windings 22, during braking, is energized through the rectifier-pair 46 which is connected to the first positive supply-conductor P1, this field-energizing circuit being completed by the closure of the controller-controlled contacts MK to MN; and since this series energizing-circuit uses the positive supply-conductors P2, P3 and P4, it is necessary to open the controller-controlled contact Mm to Mr. In Fig. 2, during dynamic braking, that is, on controller-notches B1 to B8, the four series main-field windings 22 are energized in a parallel-circuit arrangement, each series-field winding from its own rectifier-pair 46, the circuit being completed by the controller-controlled contacts MG to MJ and the conductor 67.

The series connection of the four main-field windings 22, in Fig. 1, thus requires four more contactor-controlled switch-contacts, MK to MN, during the braking operation, than are required in Fig. 2. Fig. 1 has the advantage, however, of requiring only one field-exciting current, this current being of heavy amperage (because the field-winding 22 is a series type of winding), whereas the braking connections of Fig. 2 require four such currents to be supplied from the trolley-wire 16 through the transformer 18 and the rectifiers 46. While this is an advantage, in Fig. 1, its advantage is not as great as at first blush would seem to be case, because the field-windings 22 constitute highly inductive loads on the rectifiers 46, so that the current which is drawn from the trolley-line 16 is very highly inductive, and does not constitute as great a power-loss on the alternating-current supply-circuit as might be indicated by a consideration of only the direct-current amperage which is being drawn.

In this comparison of Figs. 1 and 2, I have not counted the anode-lead contactor-switches Mk to Mr, in Fig. 1, as extra switches which are required in the series-field connection of Fig. 1, but not in the parallel-field connection of Fig. 2, during the braking operation. This is because anode-lead breakers are commonly used, in all rectifier installations, to take care of back-fire conditions, if for no other reason, so that it constitutes a relatively small matter, in Fig. 1, to add additional control-circuits to put these switch-contacts under the control of the master controller M. So far as my present invention is concerned, however, these anode-lead switch-contacts Mk to Mr are not needed in Fig. 2, and thus have been omitted.

Any suitable means may be used, for varying the braking tractive-effort during the braking operation. In both of Figs. 1 and 2, two exemplary means to this end are illustrated, first involving progressively cutting out the field-circuit variable-resistance 66 or 66′ by the progressive closure of the controller-controlled contacts MO, MP and MQ, as shown in the controller positions B2, B3 and B4. A second braking-controlling means is also shown, in controller-positions B5 to B8, in which the alternating-current supply-voltage is stepped up from the lowest-voltage position to the next higher voltage-position, first with all of the field-circuit resistance 66 or 66′ in circuit, and then this resistance is again progressively cut out by the progressive closure of the switches MO to MQ.

In all dynamic-braking positions, B1 to B8 of the master controller M, it is essential that a low-voltage tap be used on the transformer 18. In this way, the transformer is used as a means for supplying the relatively large exciting-currents which are required by the series main-field windings 22 (because they are designed to be excited by the heavy armature-currents which are drawn by the motors during motoring). The low-voltage tap-connection makes it possible to supply these heavy field-excitation currents without taking much power from the trolley-line during dynamic braking.

While I have shown my invention in only two exemplary forms of embodiment, I wish it to be understood that this showing is only illustrative, and that my invention is not limited to all of the details which are shown. I desire, therefore, that the appended claims shall be accorded the broadest construction consistent with their language.

I claim as my invention:

1. Rectifier-powdered equipment, comprising, in combination, a direct-current motor having an armature and a series main-field winding; a single-phase supply-circuit; transformer-means energized from said single-phase supply-circuit and having a plurality of voltage-changing taps for controlling the secondary voltage of the transformer-means; a rectifier-assembly for said motor, said rectifier-assembly comprising at least a pair of single-phase rectifying-devices; multi-step accelerator-means for energizing the motor-armature from the transformer-means in series with the rectifier-assembly and the series main-field winding during the motoring operation, said accelerator-means including tap-changing switching-means for varying the secondary voltage of the transformer-means; and braking-connection control-means for substantially disconnecting the motor-armature from its connection between the rectifier-assembly and the transformer-means, and for connecting a braking-resistance load across the motor-armature, and for energizing the series main-field winding from the transformer-means in series with the rectifier-assembly, during dynamic braking, said braking-connection control-means using a tap-switching connection which provides a low secondary voltage of the transformer-means.

2. Rectifier-powered equipment, comprising, in combination, a plurality of direct-current motor-assemblies for driving a substantially common load, each motor-assembly comprising one or more motors, each motor having an armature and a series main-field winding; a single-phase supply-circuit; transformer-means energized from said single-phase supply-circuit and having a plurality of voltage-changing taps for providing a controllable secondary voltage for each of the motor-assemblies; a separate rectifier-assembly for each motor-assembly, each rectifier-assembly comprising at least a pair of single-phase rectifying-devices; multi-step accelerator-means for energizing the several motor-armatures from their transformer-means in series with their respective rectifier-assemblies and their respective series main-field windings during the motoring operation, said accelerator-means including tap-changing switching-means for varying the secondary voltage of the transformer-means and braking-connection-control-means for substantially disconnecting the several motor-armatures from their connections between their rectifier-assemblies and their transformer-means, and for connecting braking-resistance loads across the motor-armatures, and for energizing the series main-field windings from the transformer-means in series with at least one of said rectifier-assemblies, during dynamic braking, said braking-connection control-means using a tap-switching connection which provides a low secondary voltage of the transformer-means.

3. The invention as defined in claim 2, characterized by said braking-connection control-means energizing the series main-field winding or windings of each motor-assembly in series with the series main-field winding or windings of at least one other motor-assembly in series with only one of said rectifier-assemblies during dynamic braking.

4. The invention as defined in claim 2, characterized by said braking-connection control-means energizing the series main-field winding or windings of each motor-assembly in series with its own rectifier-assembly during dynamic braking.

5. Rectifier-powered equipment, comprising, in combination, a plurality of direct-current motor-assemblies for driving a substantially common load, each motor-assembly comprising one or more motors, each motor having an armature and a series main-field winding; a single-phase supply-circuit; a common transformer-means energized from said single-phase supply-circuit and having a plurality of voltage-changing taps for controlling the secondary voltage of the transformer-means; a separate rectifier-assembly for each motor-assembly, each rectifier-assembly comprising at least a pair of single-phase rectifying-devices; multi-step accelerator-means for energizing the several motor-armatures from said common transformer-means in series with their respective rectifier-assemblies and their respective series main-field windings during the motoring operation, said accelerator-means including tap-changing switching-means for varying the secondary voltage of the transformer-means; and braking-connection control means for substantially disconnecting the several motor-armatures from their connections between their rectifier-assemblies and the common transformer-means, and for connecting braking-resistance loads across the motor-armatures, and for energizing the series main-field windings from the transformer-means in series with at least one of said rectifier-assemblies, during dynamic braking, said braking-connection control-means using a tap-switching connection which provides a low secondary voltage of the transformer-means.

6. The invention as defined in claim 5, characterized by said braking-connection control-means energizing the series main-field winding or windings of each motor-assembly in series with the series main-field winding or windings of at least one other motor-assembly in series with only one of said rectifier-assemblies during dynamic braking.

7. The invention as defined in claim 5, characterized by said braking-connection control-means energizing the series main-field winding or windings of each motor-assembly in series with its own rectifier-assembly during dynamic braking.

8. Rectifier-powered equipment, comprising, in combination, a plurality of direct-current motors for driving a substantially common load, each motor having an armature and a series main-field winding; a single-phase supply-circuit; transformer-means energized from said single-phase supply-circuit and having a plurality of voltage-changing taps for providing a controllable secondary voltage for said motors; a separate rectifier-assembly for each motor, each rectifier-assembly comprising at least a pair of single-phase rectifying-devices; multi-step accelerator-means for energizing the several motor-armatures from their transformer-means in series with their respective rectifier-assemblies and their respective series main-field windings during the motoring operation, said accelerator-means including tap-changing switching-means for varying the secondary voltage of the transformer-means; and braking-connection control-means for substantially disconnecting the several motor-armatures from their connections between their rectifier-assemblies and their transformer-means, and for connecting braking-resistance loads across the motor-armatures, and for energizing the series main-field windings from the transformer-means in series with at least one of said rectifier-assemblies, during dynamic braking, said braking-connection control-means using a tap-switching connection which provides a low secondary voltage of the transformer-means.

9. The invention as defined in claim 8, characterized by said braking-connection control-means energizing a plurality of series main-field windings in series with each other and in series with only one of said rectifier-assemblies during dynamic braking.

10. The invention as defined in claim 8, characterized by said braking-connection control-means energizing each series main-field winding in series with its own rectifier-assembly during dynamic braking.

11. Rectifier-powered equipment, comprising, in combination, a plurality of direct-current motors for driving a substantially common load, each motor having an armature and a series main-field winding; a single-phase supply-circuit; a common transformer-means energized from said single-phase supply-circuit and having a plurality of voltage-changing taps for controlling the secondary voltage of the transformer-means; a separate rectifier-assembly for each motor, each rectifier-assembly comprising at least a pair of single-phase rectifying-devices; multi-step accelerator-means for energizing the several motor-armatures from said common transformer-means in series with their respective rectifier-assemblies and their respective series main-field windings during the motoring operation, said accelerator-means including tap-changing switching-means for varying the secondary voltage of the transformer-means; and braking-connection control-means for substantially disconnecting the several motor-armatures from their connections between their rectifier-assemblies and the common transformer-means, and for connecting braking-resistance loads across the motor-armatures, and for energizing the series main-field windings from the transformer-means in series with at least one of said rectifier-assemblies, during dynamic braking, said braking-connection control-means using a tap-switching connection which provides a low secondary voltage of the transformer-means.

12. The invention as defined in claim 11, characterized by said braking-connection control-means energizing a plurality of series main-field windings in series with each other and in series with only one of said rectifier-assemblies during dynamic braking.

13. The invention as defined in claim 11, characterized by said braking-connection control-means energizing each series main-field winding in series with its own rectifier-assembly during dynamic braking.

LLOYD J. HIBBARD.

REFERENCES CITED

The following references are of record in the file of this patent:

UNITED STATES PATENTS

| Number | Name | Date |
|---|---|---|
| 1,483,441 | Hibbard | Feb. 12, 1924 |
| 2,539,190 | Hibbard | Jan. 23, 1951 |